United States Patent [19]

Foresta et al.

[11] 3,842,213

[45] Oct. 15, 1974

[54] TELEPHONE ANSWERING INSTRUMENT AND SYSTEM WITH DISCONNECT BY SILENCE OR TONE

[75] Inventors: Francis A. Foresta, Paramount; Elmer C. Bonsky, Long Beach, both of Calif.

[73] Assignee: T.A.D. Avanti, Inc., Paramount, Calif.

[22] Filed: May 29, 1973

[21] Appl. No.: 364,729

Related U.S. Application Data

[63] Continuation-in-part of Ser. No. 238,470, March 27, 1973, abandoned, which is a continuation-in-part of Ser. No. 52,636, July 6, 1970, abandoned.

[52] U.S. Cl. .......... 179/6 R, 179/100.1 VC
[51] Int. Cl. .......... H04m 17/02
[58] Field of Search... 179/6 R, 6 AC, 6 C, 100.1 VC, 179/1 UC

[56] References Cited

UNITED STATES PATENTS

| | | | |
|---|---|---|---|
| 2,815,401 | 12/1957 | O'Dwyer | 179/6 R |
| 3,376,390 | 4/1968 | Hashimoto | 179/6 R |
| 3,688,043 | 8/1972 | Konno | 179/6 R |
| 3,711,649 | 1/1973 | Ando | 179/6 R |

*Primary Examiner*—Raymond F. Cardillo, Jr.
*Attorney, Agent, or Firm*—Jessup & Beecher

[57] ABSTRACT

An improved telephone answering instrument and system is provided which is constructed in one embodiment to be voiceoperated so that the calling party may record a message of any length within the recording capabilities of the message tape, and so that the calling party is not limited to a predetermined message time interval. The system of the invention is constructed so that as long as a person is talking, the answering instrument remains activated. However, when the calling party hangs up, the instrument is deactivated, in the presence of either an ensuing silence on the phone line, or an ensuing continuous dial tone.

5 Claims, 3 Drawing Figures

PATENTED OCT 15 1974 3,842,213

SHEET 1 OF 2

Fig. 3. (Voice Actuation Circuit) -112-

TELEPHONE ANSWERING INSTRUMENT AND SYSTEM WITH DISCONNECT BY SILENCE OR TONE

This application is a continuation in part of pending application Ser. No. 238,470 which was filed Mar. 27, 1972 for the present inventors, entitled "TELEPHONE ANSWERING INSTRUMENT AND SYSTEM now abandoned" and which, in turn, is a continuation in part of application Ser. No. 52,636 filed July 6, 1970 now abandoned.

BACKGROUND OF THE INVENTION

The telephone answering system and apparatus of the present invention is of the general type which includes a sensing circuit that responds to a ring signal on the telephone line to activate the answering instrument. When the instrument is so activated a recorded announcement is transmitted over the line to the calling party. A message recording tape is then activated within the answering instrument in order that the calling party may record his message. In the apparatus to be described, the message recording equipment is voice-actuated, so that the calling party is not limited to any particular prescribed time interval in which to record his message. Instead, as long as he continues talking, the message is recorded.

The system and apparatus to be described is entirely solid state, and is push-button operated. The particular system is advantageous in that it is reliable and yet simple in its construction, and in that it may be installed quickly, simply and expeditiously without the need for hook-up wire connections, and without the need for electricians, mechanics, or other technicians. All that is necessary in the installation of the embodiment of the instrument of the invention to be described is to plug it into a 110-volt, alternating current outlet, and into a remote telephone jack. The announcement which is to be transmitted to the callers may then be recorded on an announcement tape in the instrument. A push-button switch is then depressed, and the equipment is ready for service.

The telephone answering instrument of the invention is also advantageous in that it is readily portable, and it may be moved as often as required to any home or business area. All that is necessary is that a telephone (or telephone jack) and an alternating current outlet be available. The telephone answering instrument to be described in susceptible to remote control whereby it may transmit its recorded messages over the phone lines to any remote point, upon the receipt of a coded control signal. The answering instrument may then be reset from the remote point to record a new series of messages.

BRIEF DESCRIPTION OF THE DRAWINGS

FIGS. 2 and 3 are circuit diagrams of certain components of the electronic system of FIG. 1.

DETAILED DESCRIPTION OF THE ILLUSTRATED EMBODIMENT

Figure 1:
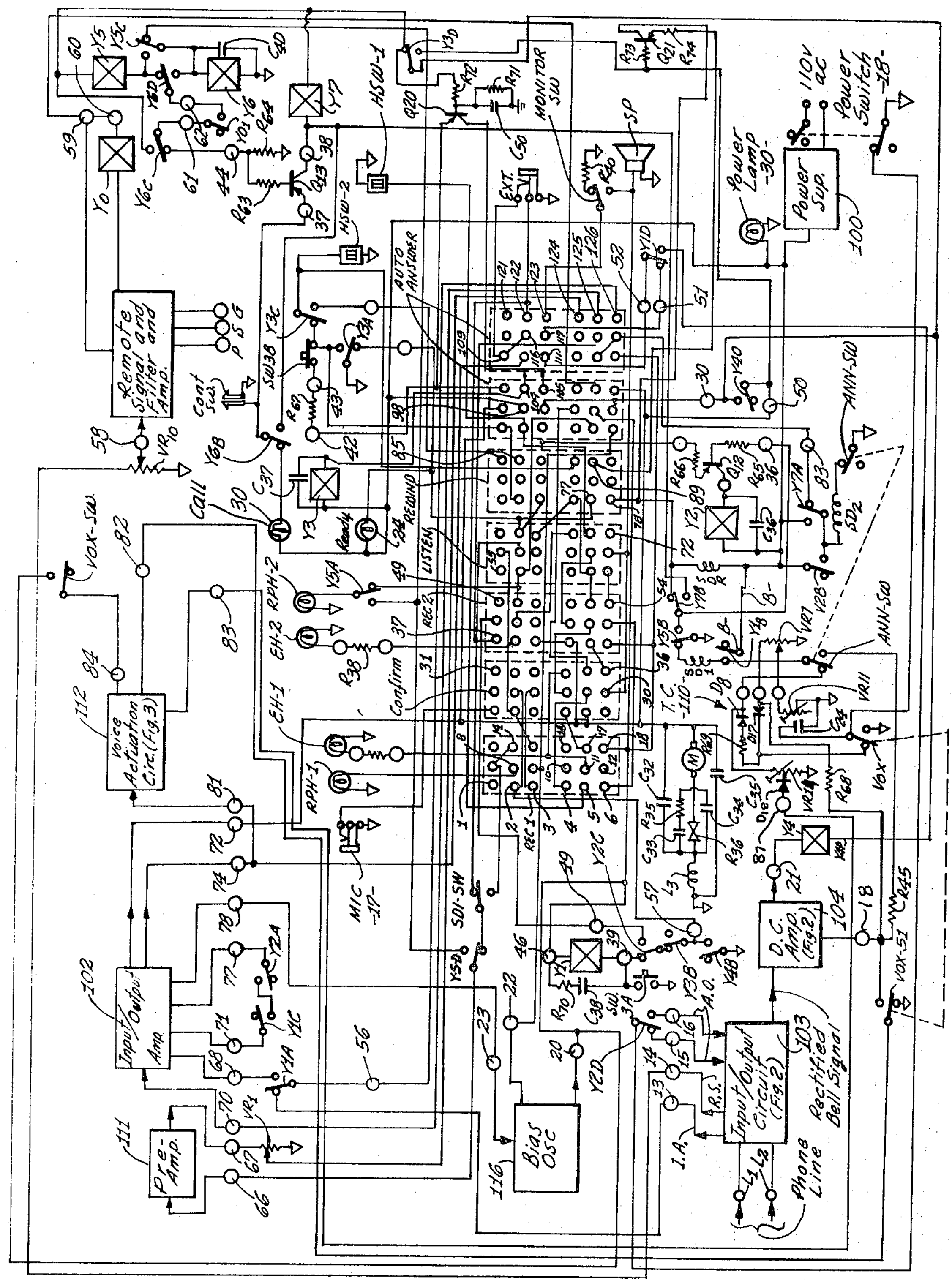
FIG. 1 is a diagram, partly in block form and partly in circuit detail of the electronic system of the invention.

The telephone answering system of FIG. 1 is of the type which is used directly with the telephone line, and it may be plugged into a usual telephone jack. The apparatus, as will be described, has the feature in that it operates independently of the telephone instrument, and it does not require that the telephone instrument be placed on top of it, as is the case with most prior art units. The apparatus answers on the first ring, and it can be set either to a recording mode or to an "announce-only" mode, insofar as incoming calls are concerned. The unit provides either a fixed time for recording each incoming call, or a voice operated recording interval, so that an incoming call continues to be recorded so long as the calling party continues to speak. The apparatus has two-way conversation recording capabilities. It also is capable of monitoring incoming calls through an internal speaker. When the message recording tape is full of recordings of incoming calls which have been processed, the unit automatically converts to an "announcement only" mode, so that it continues to answer incoming calls. The unit is also capable of remote control, which includes a complete playback operation, including stop, start, repeat, store and reset from any telephone anywhere.

In the system shown in FIG. 1, a microphone may be plugged into a receptacle 17 for recording announcements, as will be described. A series of push-button switches are included, and these are designated "Auto Answer," "Rewind," "Listen," "Confirm," "Record 1," and "Record 2." A thumb operated "On-Off" power switch 18 is also included, as well as a thumb actuated volume control 22. In addition, a series of indicator lights designated "power," "Ready" and "Call" are included in the system, these lights being designated 20, 24 and 30 respectively.

In order to install and operate the system shown in FIG. 1, it is plugged into a usual 110-volt AC outlet, and it is also plugged directly into a telephone jack, or otherwise connected to a telephone line.

The telephone answering system is equipped with a loop announcement tape on which an announcement is recorded, so that any time a telephone ring signal is received, a recorded announcement may automatically be transmitted to the caller. Incoming calls may be listened to by setting a monitor switch (FIG. 1) which connects a speaker "SP" (FIG. 1) into the circuit, so that incoming messages may be monitored as they are being recorded. Outgoing calls may be made merely by turning off the instrument and by using the telephone in a normal manner.

A remote control unit permits the system of FIG. 1 to be operated from a remote point. This is achieved by dialing the phone number of the telephone serviced by the instrument, and by then depressing a push-button on the remote control unit. This causes the remote control unit to emit a distinct tone which is transmitted over the telephone line and which is picked up by the circuitry of the system. When the remote control unit is operated from the remote point, the message tape in the system is caused to rewind to its origin position, and it is then caused to move forward so that the various messages recorded on the tape may be reproduced and transmitted by the telephone over the telephone lines to the remote point at which the caller is situated.

The system of FIG. 1 includes a loop magnetic announcement tape on which the announcement to be transmitted over the telephone line is recorded. The announcement is recorded on the tape by means, for example, of a record/playback head (RPH-1), and the announcement may be erased from the tape by means of an erase head (EH-1). The announcement tape is actuated whenever the solenoid (SD-1) (FIG. 1) is energized. A microswitch SD-1-SW (FIG. 1) is associated with the announcement tape transport. This switch is operated whenever the announcement tape transport is actuated, and it serves to switch the circuitry to a transmit mode so that the recorded announcement may be transmitted over the telephone line, as will be described.

A message tape is driven by a pinch roller assembly, which is selectively moved against a rotating capstan to drive the tape when a solenoid (SD-2) (FIG. 1) is energized. The record/playback head (RPH-2) is provided in conjunction with the message tape, as well as an erase head (EH-2). During rewind, the tape is moved from the left to the right, as it is rewound on the feed reel when a solenoid SDR (FIG. 1) is engaged. As shown in the diagram of FIG. 1, for example, the stem may be connected directly to the telephone line, as designated by the terminals $L_1$ and $L_2$, so as to respond to the ring signals on the line.

The push-button switches described above are six-pole, double-throw switches, as shown in FIG. 1. For example, when the "Record 1" push-button switch is not actuated, its common terminals 2, 8 and 14 connect respectively with the upper terminals 1, 7 and 13, and its lower common terminals 5, 11 and 17 connect respectively with its upper terminals 4, 10 and 16. However, when the push-button switch is actuated, its common terminals 2, 8 and 14 connect respectively with its lower terminals 3, 9 and 15, whereas its common terminals 5, 11 and 17 connect respectively with its lower terminals 6, 12 and 18. This also applies to the "Confirm" push-button switch, the "Record 2" push-button switch, the "Listen" push-button switch, the "Rewind" push-button switch, and the "Auto Answer" push-button switch.

As a preliminary setting for the system, it will be assumed that the "Auto Answer" push-button switch has been depressed, so that the system is in the stand-by mode awaiting an incoming ring to set it in operation. For that mode, the common terminals 92, 98, 104, 116 and 122 of the "Auto Answer" push-button switch are connected respectively to the terminals 93, 99, 105, 111, 117, and 123; and the common terminals 95, 101, 107, 113, 119 and 105 are connected respectively to the terminals 96, 102, 108, 114, 120 and 126.

For the actuated position of the "Auto Answer" switch, and when the power switch 18 is on, the power supply 100 in FIG. 1 is energized, so that a negative direct voltage is applied to the lead designated B-. This negative voltage causes the Power lamp 20 to be energized. Also, the message tape is assumed to be at its origin position, so that the switch CONT-SW is closed, and so that the "Call" lamp 20 is energized. The Ready lamp 24 is also on, as its path is returned through the normally closed contact Y3A of FIG. 1 to ground.

Figure 2:
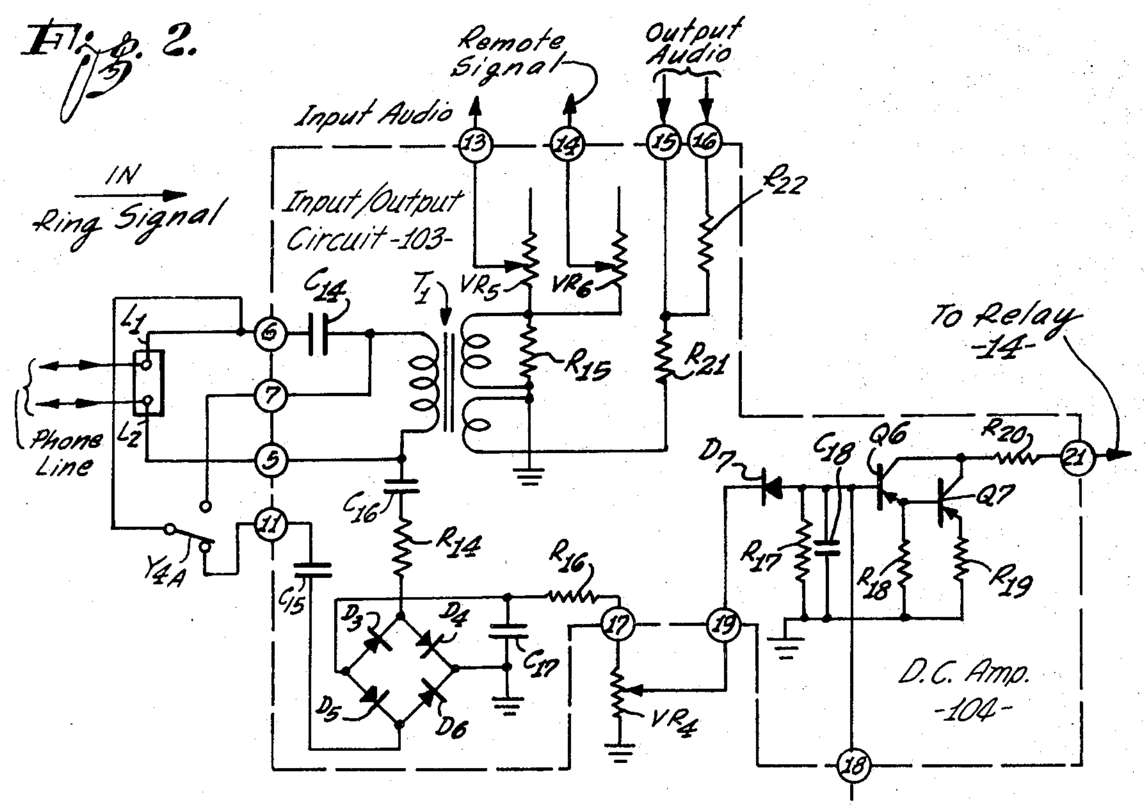
Figure 2:
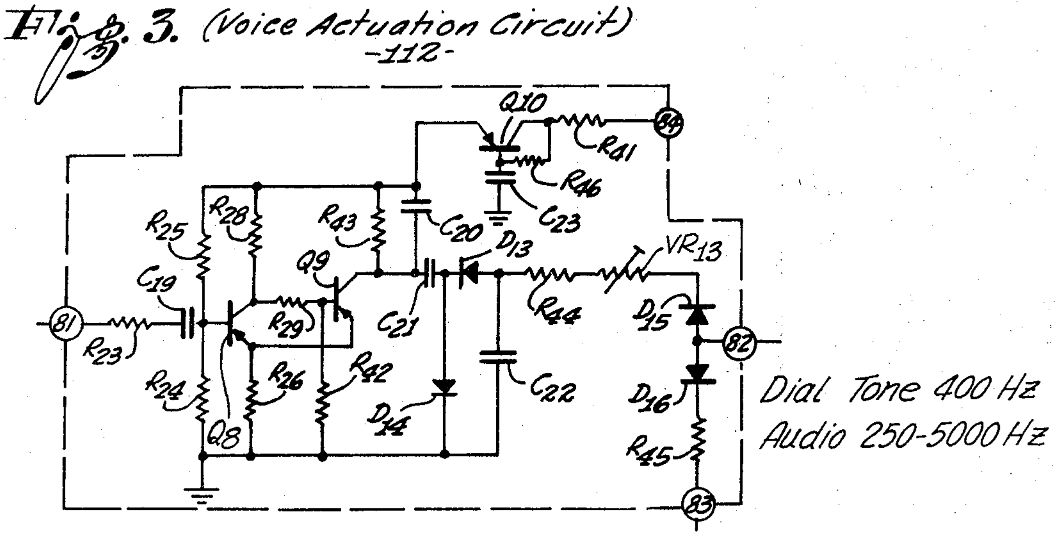

Now, should a ring signal be received over the telephone line, the ring signal is introduced by way of input terminals $L_1$ and $L_2$ to the input and output circuit 103, and it appears across a ring rectifier. As shown in FIG. 2, the ring rectifier is made up of diodes D3, D4, D5 and D6; a pair of capacitors C15 and C16, each having a capacity, for example, of 0.50 microfarads; and a resistor R14, having a resistance of 50 kilo-ohms, connected as shown in FIG. 2. The ring signal is introduced to the rectifier through the normally closed relay terminals Y4A (FIG. 2). The resulting rectified signal charges a grounded capacitor C17 of 50 microfarads, and appears as a direct current voltage across a 50 kolo-ohm resistor R16 and a potentiometer VR4 shunting the capacitor. The potentiometer VR4 serves as a ring signal sensitivity control.

The ring signal is introduced to a direct current amplifier 104 through a silicon diode D7, the direct current amplifier being formed of a pair of PNP transistors Q6 and Q7 and associated circuitry, connected as shown in FIG. 2. The direct current amplifier includes a 22 kilo-ohm resistor R17, and a 50 microfarad capacitor C18 connected to ground and to the base of the transistor Q6, a 500 ohm resistor R18 connected to the emitter of the transistor Q6 and a 10 ohm resistor R19 connected to the emitter of the transistor Q7, both the resistors R18 and R19 being grounded.

The direct current amplifier 103 now draws current through a 100 ohm resistor R20 and through a relay Y4 (FIG. 1) to energize the relay. The energization of the relay Y4 causes the contact Y4A to close (FIG. 2) placing the primary of a transformer T1 across the input terminals $L_1$ and $L_2$ through a .1 micromicrofarad capacitor C14. The relay contacts y4B also close when the relay Y4 is energized, causing the relay Y1 to be energized. When the relay Y1 is energized, the contacts Y1A close so that incoming messages may be fed to the audio amplifier circuit 102 of FIG. 1.

When the relay Y1 is energized, it also closes the contacts Y1B so as to connect the negative lead (B-) to a timer circuit 110 (FIG. 1). The timer circuit is energized through normally closed contacts of one section of an Announce-Record switch. These contacts are connected through a diode D8 in a timer circuit to a 400 ohm resistor R69. The resistor R69 is connected back through a diode D19 to a 100 kilo-ohm potentiometer VR7. The potentiometer VR7 is connected to a further 10 kilo-ohm potentiometer VR11 which, in turn, is connected to ground. The potentiometer VR7 is also connected through a 5 kilo-ohm resistor R68 which is connected back to the DC amplifier 104 and, by way of terminal 18 of that amplifier to the base of the transistor Q6 (FIG. 2).

The aforesaid contacts of the Announce-Record switch are also connected to a grounded potentiometer VR14 having a resistance of 10 kilo-ohms. The output terminal 83 of the voice actuation circuit 112 is connected to that potentiometer through a silicon diode D18. The terminal 82 of the voice actuation circuit is connected by way of one section of a Vox-SW siwtch to the input terminal 18 of the DC amplifier 104. The Vox-SW switch has a further section with normally closed contacts connected to a capacitor (FIG. 1) and to the junction of resistor 69 and diode D19, and with normally open contacts connected to ground. The capacitor C24 may have a capacity of 100 microfarads and it is grounded.

The Vox-SW switch has yet another section connected to the terminal 84 of the voice actuation circuit. When the three sections of the Vox-SW switch are in their illustrated positions, the system is set for a predetermined time interval for recording calls on the message tape, the time interval being established by the discharge time of the capacitor C24 through the various resistances and potentiometers associated therewith. However, when the three sections of the Vox-SW switch are in the other position, the time interval of each message is controlled by the output from the voice actuation circuit 112, so that as long as the calling party continues talking, his message is recorded on the message tape.

The latter control is accomplished by the voice actuation circuit 112, as shown in circuit detail in FIG. 3. In a manner to be described, the audio signals representing the incoming calls are applied to the input terminal 81, and are then applied to a circuit formed by a pair of PNP transistors Q8 and Q9. The terminal 81, as shown, is connected to a 3.3 kilo-ohm resistor R23 which, in turn, is connected to a 1 microfarad capacitor C19. The capacitor C19 is connected to the junction of a pair of resistors R24 and R25 and to the base of the transistor Q8. The resistor R24 is grounded, and it has a resistance of 4.7 kilo-ohms. The resistor R25, on the other hand, has a resistance of 100 kilo-ohms. The collector of the transistor Q8 is connected to a 6.8 kilo-ohm resistor R28 and to an 8.2 kilo-ohm resistor R29.

The emitter of the transistor Q8 and the emitter of the transistor Q9 are connected to a common grounded 47 ohm emitter resistor R26. The resistor R29 is connected to a grounded 4.7 kilo-ohm resistor R42 and to the base of the transistor Q9. The collector of the transistor Q9 is connected to a 6.8 kilo-ohm resistor R43. The resistors R25, R28 and R43 are all connected to the emitter of a PNP voltage stabilizing transistor Q10. The base of the transistor Q10 is connected to a grounded 100 microfarad capacitor C23 and to a resistor R46 or 4.7 kilo-ohms. The collector of the transistor Q10 and the resistor R46 are connected through a 10 ohm resistor R41 to the terminal 84 of the voice actuation circuit. As shown in FIG. 1, this terminal is connected to the third section of the Vox-SW switch, so that the voice actuation circuit 112 is energized only when the Vox-SW switch is placed in it second position.

The collector of the transistor Q9 is connected to a 10 microfarad capacitor C21 which, in turn, is connected to the anode of a silicon diode D14. The capacitor C21 is also connected to the cathode of a further silicon diode D13. The cathode of the silicon diode D14 is grounded. The anode of the silicon diode D13 is connected to a grounded capacitor C22 of 200 microfarads and to a 4.7 kilo-ohm resistor R44. The resistor R44 is connected to a 20 kilo-ohm potentiometer VR13 which, in turn, is connected to the cathode of a silicon diode D15. The anode of the silicon diode D15 is connected to the output terminal 82 and to the anode of a silicon diode D16. The cathode of the silicon diode D16 is connected through a 10 kilo-ohm resistor R45 to the output terminal 83.

In the voice actuation circuit of FIG. 3, whenever the input signal at the input terminal has positive peaks in excess of 33 millivolts, for example, the normally conductive transistor Q8 is rendered non-conductive which, in turn, causes the normally non-conductive transistor Q9 to become conductive. This results in negative pulses appearing at the collector of the transistor Q9 as capacitor C20 discharges. These pulses are rectified by the diodes D13 and D14 and a negative charge is produced across the capacitor C22.

For a discontinuous audio signal produced by the normal speech of a calling party, the aforesaid positive peaks are spaced sufficiently to cause the capacitor C20 in the time constant circuit C20/R43 to charge and discharge. However, should the calling party hang up so that the discontinuous audio signals are replaced by silence, no further current pulses flow through the capacitor C21 to be rectified by the diodes D13 and D14, and the capacitor C22 loses its charge. Likewise, if a calling party hangs up, and a continuous dial tone appears on the line, so that the transistor Q9 is essentially continuously conductive, rather than intermittently conductive as is the case upon the peaks of the discontinuous voice signals, and the time constant of the circuit C20/R43 is such that the capacitor C20 charges up and retains its charge for the duration of the dial tone. The charge on capacitar C20 now blocks any flow of current into the capacitor C22, so that again the capacitor C22 loses its charge. Only so long as the capacitor C22 remains charged will the relay Y4 remain energized to connect the system to the telephone lines. Therefore, when the calling party stops talking, and a dial tone signal, or no signal at all, appears on the telephone line, the capacitor C22 will discharge and the system will be disconnected from the line.

To reiterate, should the calling party hang up, and there results in either silence on the telephone line, or a continuous dial tone signal, in either event, the circuit of the transistors Q8 and Q9 no longer applies the negative-going pulses through the capacitor C21 to the rectifying diodes D13, D14. As a result, the capacitor C22 discharges through the circuit of the resistor R44, potentiometer VR13 and diode D15, and through the base-emitter circuit of the transistor Q6 of FIG. 2, by way of the output terminal 82 of FIG. 3 which is connected to the input terminal 18 of FIG. 2. The voltage at the base of the transistor Q6 is a bias voltage which renders the transistors Q6 and Q7 conductive to apply a ground to the relay Y4. When the capacitor C22 discharges, the bias voltage drops and the transistors Q6 and Q7 become non-conductive, and this causes the relay Y4 to be de-energized and to disconnect the system from the telephone line.

The relay Y4 is held energized during the voice actuated mode (Vox), so long as the calling party is talking and maintains the capacitor C22 in the voice actuation circuit 112 of FIG. 3 in a charged condition. However, when the calling party hangs up, resulting either in silence or a continuous dial tone, the capacitor C22 discharges, as described above, to de-energize the relay Y4 and disconnect the system from the telephone line. In the timed mode, the relay Y4 is held energized so long as the capacitor C24 in the timer circuit 110 retains its charge. In each case, the relay Y4 remains energized so long as the terminal 18 of the amplifier 104 is sufficiently negative to maintain the transistor Q6 in the amplifier in conductive condition.

As mentioned above, the initial energizing of the relay Y4 causes the contacts Y4B to close, so that the relay Y1 is energized to set the system to the announcement transmitting mode. It will be appreciated that so long as the relay Y1 is energized, the timing cycle of the timer or of the voice actuated circuit does not begin. This is because the capacitor C24 of the timer circuit 110 is maintained in its charged state during the announcement mode by the closed contacts Y1B, so that the appropriate bias is applied directly to the DC amplifier 104 to hold the relay Y4 energized.

It is only after the relay Y1 is de-energized and the system switched to its message receiving and recording mode by the energization of the relay Y2, that the timing cycle begins. The relay Y4 is de-energized a certain time after the beginning of the message recording mode to disconnect the system from the telephone line. The particular time interval depends upon whether the system is in the fixed message recording time mode, or is set to the voice actuated message recording time mode.

The energizing of the relay Y4 when the system is first switched from its stand-by mode to its announcement mode by the receipt of a telephone ring signal also causes the relay contacts Y4D to close to energize the motor M. The motor circuit M, as shown in FIG. 1, includes a filter choke L3, and it also has an associated filter network including capacitors C32, C33, C34 and C35. These capacitors have values of 0.1, 10, 0.01 and 0.5 microfarads respectively. The filter network also includes a resistor R36 having a resistance, for example, of 10 ohms.

The motor M remains energized so long as the system is operational. The motor drives both the announcement tape 60 and the message tape 64 when their corresponding pinch roller assemblies are actuated by the selective energization of the solenoids SD-1 and SD-2. When the relay Y1 is energized, the system is set to its announcement mode, and the relay contacts Y1B close to charge the capacitor C24 in the timer circuit 110 so as to apply the necessary bias to the amplifier 104 to hold the relay Y4 energized. The solenoid SD-1 is also energized during this mode, and this solenoid actuates the pinch roller assembly associated with the announcement tape transport (not shown) and causes the announcement tape to be driven. The playback head RPH-1 associated with the announcement tape senses the announcement on the tape, and applies the audio signals corresponding to the announcement through the microswitch SD1-SW (which is now actuated) to the pre-amplifier circuit 111. The output from the pre-amplifier is then applied to the input/output amplifier 102 and the amplified output from the latter amplifier is applied to the input/output circuit 103, so that the announcement may be applied to the telephone line.

During the announcement mode, and as described above, the relays Y4 and Y1, and the solenoid SD-1 are energized, and the announcement signal is read by the playback head RPH-1, passed through the actuated switch SDI-SW, and amplified by the amplifiers 111 and 102, as described above. The amplified announcement from the audio amplifier 102 is applied to the lower winding of the transformer T1 in the input/output circuit 103 of FIG. 2 through the contact Y2D and terminal 16 of FIG. 1 and through a pair of resistors R21 and R22 of 50 and 100 ohms respectively. In this way, the recorded announcement on the announcement tape 60 is transmitted over the telephone line. At the end of the announcement, the relay Y2 is energized. The system is now switched from its announcement mode when the relays Y4 and Y1 are energized, to its message receiving mode when the relays Y4 and Y2 are energized.

The energization of the relay Y2 is achieved through the closed contacts 92 and 93 of the actuated "Auto Answer" pushbutton switch, and through a 5 ohm resistor connected to the emitter of the transistor Q12, the collector of which is connected to the relay Y2. The other terminal of the terminal Y2 is connected to the B- lead. When the relay Y2 is energized, the relay contacts Y2C are actuated so as to de-energize the relay Y1. This causes the contacts Y1B to open removing the unidirectional potential from the timer circuit 110, and initiating the timing cycle. At the same time, the contacts Y2B close energizing the solenoid SD-2 which causes the message tape to be actuated. The incoming message from the calling party is now recorded by the head RPH-2 on the message tape.

The incoming message is amplified in the amplifier 102, and its output from terminal 78 is applied to the bias oscillator 116 by terminal 23 to modulate the alternating current bias output signal. Then, the modulated bias signal is applied to the switching contact 96, and then to the switching contact 95, and from there to the record head RPH-2 through the switch contact 56. Therefore, during the message recording mode, the incoming message signal modulates the alternating current signal from the bias oscillator, and the resulting modulated signal is recorded on the message tape by the record head RPH-2.

At the same time, the output from the input/output amplifier 102 is fed to the switch contact 110 by the output terminal 74, and from there it is switched to the switch contact 111 and through the normally closed relay contacts Y1D to the switch contact 117, and from there to the switch contact 116, and through the switch contact 109 to the extension jack marked "Ext." Therefore, the incoming messages may be monitored, merely by plugging a speaker into the extension jack "Ext." The incoming messages may also be monitored by the speaker SP by moving the adjacent "Monitor" switch to the down position.

It will be understood, therefore, that during the announcement mode, the relays Y4 and Y1 are energized so that the announcement tape is actuated and the timer circuit 110 is set. During the message receiving and recording mode, the relay Y4 remains energized, and the relay Y2 is energized, but the relay Y1 is de-energized. When the relay Y1 is de-energized, the solenoid SD1 is de-activated so that the announcement tape is stopped at its origin position, as established by the closure of the switch HSW-1.

As mentioned above, so long as the message receiving and recording mode continues, the signal applied to the DC amplifier 104 by the way of the input terminal 18 maintains the relay Y4 energized. At the end of the timed cycle the capacitor C24 discharges in the timer circuit 110, or during the voice actuated mode, the capacitor C22 discharges in the voice actuation circuit 112 of FIG. 3, to remove the signal from the DC amplifier 102 so that the relay Y4 is de-energized.

When the relay Y4 is de-energized, the system returns to its stand-by mode. The contacts Y4B return to their normally open position, and the relay Y1 cannot again be energized until the relay Y4 is again energized. The relay Y2 is also de-energized at this time, causing the contacts Y2B to open and thereby de-energizing the solenoid SD2 to stop the message tape. When Y4 is de-energized, the relay Y2 is de-energized since the contacts Y2C not only serve to de-energize Y1 when Y2 is energized, but also form a holding circuit for the relay Y2. Then, when the relay Y4 is de-energized the contacts Y4B open to open the holding circuit for the relay Y2, and therefore the relay Y2 also is deenergized.

The relay Y2 is shunted by a 200 microfarad capacitor C36, and the relay Y1 is shunted by a 500 microfarad capacitor C38 and a 100 ohm series resistor R70.

During the transition from the announcement mode to the message recording mode, during which the relay Y1 is de-energized and the relay Y2 is energized, the circuit C38, R70 produces a slight delay in the de-energization of the relay Y1, and an internal oscillation is set up when both Y1 and Y2 are on at the same time briefly, as the contacts Y1C and Y2A are closed setting a regenerative feedback path in the amplifier 102. This produces a "beep" tone which is recorded on the message tape at the beginning of each message, and which serves as a message separation on the message tape.

The message tape is now ready to receive and record the incoming messages. The message tape continues to record messages until an end of tape sensing element causes the switch contacts HSW-2 to close. When that occurs, the circuitry of the transistors Q20 and Q21 switches the system to the "announce-only" mode. During the "announce-only" mode, the announcement tape continues to be activated in response to incoming messages and announcements are transmitted to the calling party. However, no further messages are recorded on the message tape.

The rewind operation is instituted by actuating the "Rewind" push-button switch which comprises the switch contacts 73–90 in FIG. 1. This, as mentioned above, causes the contacts 74, 80 and 86 to break with the contacts 73, 79 and 85, respectively, and to engage the contacts 75, 81 and 87; and causes the contacts 77, 83 and 89 to break with the contacts 76, 82 and 88, and to engage selectively with the contacts 78, 84 and 90. When the "Rewind" push-button switch is depressed, a ground is established at the upper end of the rewind solenoid SDR through the switch contacts 77 and 78, and through normally closed contacts Y3A of a protective relay Y3. The rewind solenoid SDR remains energized until the protective relay Y3 is energized. The relay Y3 is shunted by a 200 microfarad capacitor C37. The energizing of the solenoid SDR causes the message tape 64 of FIG. 5 to rewind until the sensing element 65 causes the switch G-SW2 to close. When that occurs, the protective relay Y3 is energized through the start switch SW3B (FIG. 1), through a 10 kilo-ohm resistor R67, through the circuit of a transistor Q20, and through switch contacts 105 and 104.

When the protective relay Y3 is energized, the normally closed contacts Y3A open to cause the rewind solenoid SDR to be de-energized, and the normally open contacts Y3A closed to form a holding circuit for the relay Y3. The normally closed contacts Y3B also open to assure that the relay Y1 is de-energized, and the normally open contacts Y3C close. When the contacts Y3C close, the message mode relay Y2 becomes energized to energize the solenoid SD2 to cause the message tape to start in its forward direction. The message tape moves forward until the element 65 moves off the switch HSW-2. When that occurs, the relay Y2 is de-energized, and the system is ready for the next cycle.

It should be noted that when the "Auto Answer" switch is off, the B- lead is connected by switch contacts 98 and 97 directly to the terminal 72 to energize the pre-amplifier 112 and input/output amplifier 102 and to the motor M so that the drive motor is energized. Also, the (B-) is applied to the contacts 35, 40 and 41 of the "Record-2" switch, so as to exert a bias through the 1.5 kilo-ohm resistor R38 on the erase head EH-2. This means that all previous recordings are erased by the erase head prior to the new recordings being made on the tape by the head RPH-2. As mentioned above, if the "Rewind" button is pushed at the same time as the "Record-2" button, the message tape may be erased during the rewind operation.

The output terminal 74 of the input/output amplifier 102 of FIG. 1 is also connected to the input terminal 81 of the voice actuation circuit 112. The exciting potential for the voice actuation circuit is applied to the terminal 84 whenever the adjacent Vox-SW switch (FIG. 1) is set to the upper position. So long as the Vox-SW switch is in the illustrated position, the voice actuation circuit 112 is not active, and that occurs when the system is set in its timed mode, and the timer circuit 110 establishes a predetermined time interval for each message to be recorded on the message tape. As mentioned above, when the voice actuation circuit 112 is active, the messages may continue to be recorded on the message tape so long as there is an audio input to the voice actuation circuit.

So long as the capacitor C22 remains charged in the circuit of FIG. 3, the output terminal 82 causes a negative bias to be applied to the DC amplifier 104 in FIG. 1, so that the relay Y4 is held energized, which is essential to maintain the system effectively connected to the telephone lines. The timer capacitor C24 in the timer circuit 110 is disconnected and discharged at this time by the silicon diode of the Vox-SW switch adjacent the timer circuit. However, at the end of an incoming message, the capacitor C22 begins to discharge through the resistor R44 and through the associated potentiometer VR13 in the timer circuit 110, as described above. The parameters of the resistance-capacitance circuit are such that the discharge time constant is relatively fast, as compared with the discharge time of the capacitor C24 in the timer circuit when the system is in the fixed time message recording mode of operation.

A feature of the system is that it may be controlled from a remote point, and merely by introducing a tone of a predetermined frequency into the telephone line. The system must be in the "Auto Answer" mode in order to process the tone signal, that is, the "Auto Answer" push-button switch must be actuated. Assuming at that time that a number of previous messages have already been recorded on the message tape, then, upon receipt of the tone signal, the system is automatically placed in the "Rewind" mode, so that the message tape is rewound to its origin position. The system is then placed in its "Listen" mode, and the messages recorded on the message tape are now, instead of being fed into the loudspeaker SP, it is fed through the input/output amplifier 102 to the telephone line so that the messages may be heard by the person originating the tone signal.

When the proper tone is received, and the relay YO is energized, the contact YO1 closes, so that the relay Y5 is energized, as the circuit is completed through the normally closed contacts Y6C and Y6D, and through the grounded 40 ohm resistor R64. The relay Y6 is also energized at this time as the contacts Y5C close. The relay YO drops out when the tone signal stops, but the relays Y5 and Y6 remain energized. The rewind solenoid SDR is now energized as the relay contacts Y5B close, so that the message tape 64 is rewound to its origin position. When the message tape reaches its origin position at the end of the rewind operation, the switch CONT-SW closes to energize the relay Y7. The normally closed relay contacts Y7B now opens to de-energize the solenoid SDR.

The message solenoid SD2 is now energized through the closed contacts Y7A, and the message tape 64 begins to move in its forward direction. The recorded messages on the message tape are sensed by the head RPH-2 and are applied through the closed relay contacts Y5A and Y5D and through the switch SD1-SW to the preamplifier 111. The amplified signals are further amplified by the input/output amplifier 102. The output from the input/output amplifier 102 is applied across the "Auto Answer" switch contacts 110 and 111, and across the closed relay contacts Y1D, and through the normally closed relay contacts Y2D, to the input/output circuit 103 for transmission over the phone lines to the person originating the tone.

It might be pointed out that during the remote mode, the relay Y2 is not energized, and the message solenoid SD2 is activated by the relay Y7, as described above. The relay Y1, however, is energized. Even though the relay Y1 is energized, the announcement tape solenoid SD1 is not energized during the remote mode because the normally closed relay contacts Y5B are now open. It might also be pointed out that during the remote mode, the negative potential B- is applied to the lead connected to the remote signal filter and amplifier 130 and to the relays YO, Y5 and Y7, the connection being completed through the switch contacts 107 and 108, 99 and 98 of the actuated "Auto Answer" push-button switch, and through the closed relay contacts Y4D. The normally closed relay contacts Y3D energize the circuit of the transistor Q20 at this time through a 10 kilo-ohm resistor R72 connected to the base of the transistor. The base is also connected to a grounded 30 kilo-ohm resistor R71 which is shunted by a 470 microfarad capacitor C50.

After the calling party has received the messages from the message tape, he should again transmit the tone signal over the phone line. If this is done, the relay YO is again energized which causes the relay contacts YO to close shorting out the relay Y5 and causing it to be de-energized. Then, when the tone is terminated, the relay Y6 is de-energized which causes the relay Y7 to be de-energized and the message tape 64 to be stopped at that point, and the system is now in readiness to receive and record additional messages. The calling party may then transmit a further tone over the phone lines, and the further tone will set the system to the rewind mode, as mentioned above, so as to return the message tape to its origin position. At that point, the calling party may transmit yet a further tone signal to stop the message tape at its origin position, so that the system is then in readiness to receive and record an entirely new set of messages.

As mentioned above, the system may be set to an "Announce Only" mode. When in such a mode, no messages are recorded, and the system responds to incoming calls only by transmitting the announcement on the announcement tape over the telephone line to the calling party. The instrument may be set to the "Announce Only∞ mode by moving the Announce-Record switch from its illustrated position to its second position.

A first section of the Announce-Record switch is connected to the solenoid SD2, so that when the switch is moved to its second position, the solenoid cannot be energized so that the message tape 60 cannot be activated. A second section of the Announce-Record switch switches the SD1 solenoid from the timer circuit 110 to the DC amplifier 104 through a 100 kilo-ohm resistor R45 so that the system remains activated only for the duration of the announcement, and is then de-energized.

While particular embodiments of the invention have been shown and described, modifications may be made. It is intended in the following claims to cover all modifications which come within the spirit and scope of the invention.

What is claimed is:

1. In a telephone answering system for responding to telephone calls received over a telephone line and which comprises an announcement storage means and a message storage means and respectively associated transducers, and first and second means for driving said announcement storage means and said message storage means respectively relative to said transducers for producing a recorded announcement from the announcement storage means in response to an incoming telephone call and for subsequently recording a message from the calling party on said message storage means, the combination of: first control circuit means for activating said announcement storage driving means in response to said incoming telephone call to reproduce said recorded announcement for transmission to the calling party; second control circuit means coupled to said announcement storage means for activating said message storage driving means so as to initiate the recording of the aforesaid message from the calling party on said message storage means at the termination of the transmission of the announcement; third control circuit means for de-activating said message storage driving means so as to terminate the recording of the aforesaid message on said message storage means; and a further circuit means for receiving discontinuous audio signals corresponding to said message and for developing a control signal in response to said discontinuous audio signals for application to said third control circuit means to maintain said third control circuit means ineffective as long as said message continues, said further circuit means including a first network having means responsive to said discontinuous audio signals for developing a charging current in the form of pulses only in the presence of said discontinuous audio signals; a second network connected to said first network and including means to be charged by the charging current pulses developed thereby so as to develop said control signal only in the presence of said charging current pulses, said means in said second network including rectifier means for rectifying said pulses, and said means in said second network further including a capacitor for receiving the rectified pulses from said rectifier to be charged thereby and across which said control signal is developed, and a third network connected to said second network including means for discharging said second network in the absence of said charging current.

2. The conbination defined in claim 1, in which said first network includes a circuit having means for developing a pulsating current in response to said discontinuous audio signals, and rectifying means for producing the aforesaid charging current only in the presence of said pulsating current.

3. The combination defined in claim 1, and which also includes a timing circuit having means adpated to be connected to said third control circuit means for maintaining said third control circuit means ineffective for a predetermined interval established by said timing circuit means, and switching means for selectively connecting said further circuit and said timing circuit means in circuit with said third control circuit means.

4. The combination defined in claim 1, in which said means in said second circuit includes a capacitor for receiving said charging current and across which said control signal is developed.

5. The combination defined in claim 4, in which said means in said third network includes a resistance discharge circuit for said capacitor to cause said capacitor to discharge at a predetermined rate in the absence of said charging current.

* * * * *